March 25, 1969 N. SZEREMY 3,435,139

CONTRAST CONTROL CIRCUIT FOR TELEVISION RECEIVER

Filed March 25, 1966

INVENTOR:
NORMAN SZEREMY,
BY William S. Wolfe
HIS ATTORNEY.

United States Patent Office 3,435,139
Patented Mar. 25, 1969

3,435,139
CONTRAST CONTROL CIRCUIT FOR TELEVISION RECEIVER

Norman Szeremy, Syracuse, N.Y., assignor to General Electric Company, a corporation of New York Filed Mar. 25, 1966, Ser. No. 537,463
Int. Cl. H04n 3/16
U.S. Cl. 178—7.3 5 Claims

ABSTRACT OF THE DISCLOSURE

The invention involves the use of a conventional stopless potentionmeter for the contrast control, the "cold" end of the potentiometer being connected to the grid of the AGC keyer stage conventionally employed in television receivers rather than directly to the B+ supply. The grid of such an AGC keyer tube is connected to the B+ supply through a relatively low value resistor which thus serves as a limiting resistor in series with the contrast control potentiometer. In this manner the necessity for a discrete limiting resistor or a potentiometer employing a stop is eliminated.

Figure 1:
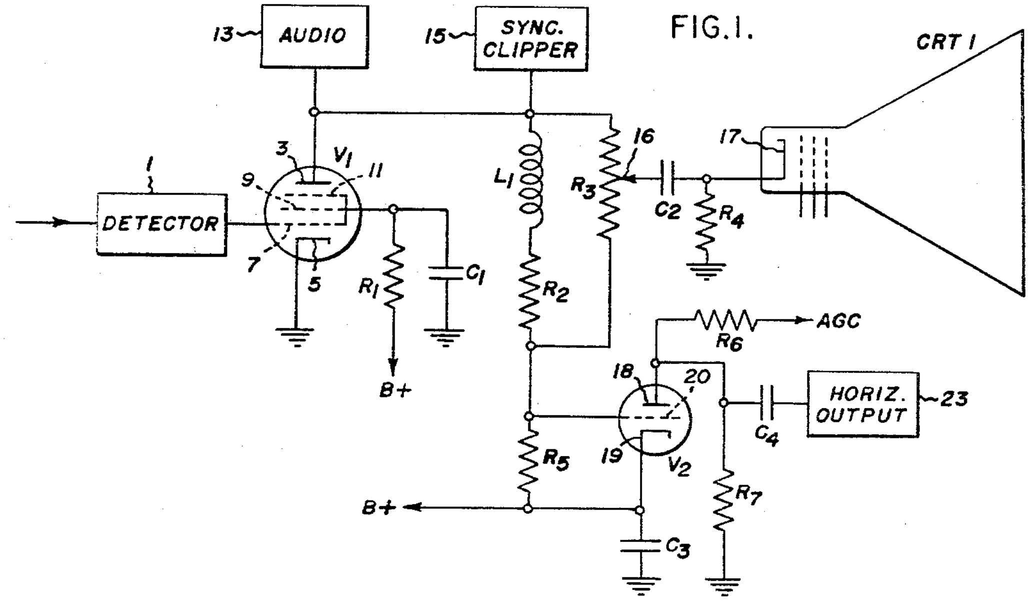

The present invention relates to television receivers and more specifically to an improved contrast control circuit for such receivers.

A contrast control is conventionally utilized in a television receiver to control the peak to peak amplitude of the video signal applied to the cathode ray tube.

Generally, such a contrast control comprises a potentiometer connected to the output electrode of the video output stage. More specifically, the contrast control generally comprises a potentiometer connected between the output electrode of the final video amplifier and the B+ supply, the movable tap of the potentiometer being connected to the cathode of the cathode ray tube to apply the video signal thereto. In this manner, the position of the movable tap of the contrast potentiometer defines the peak to peak amplitude of the video signal applied to the cathode of the cathode ray tube and thus provides the desired contrast control.

In such a circuit the positioning of the movable tap of the contrast potentiometer at the minimum position on the side of the potentiometer connected to the B+ supply, results in a complete loss of video drive to the cathode ray tube. The complete loss of the video drive in this manner is undesirable since the user, due to the absence of a picture, may improperly conclude that the receiver is defective.

Accordingly, the prior art has employed a limiting resistance in series with the potentiometer to insure the presence of some resistance between the movable tap of the potentiometer and the B+ supply even when the tap is in the minimum position. This limiting resistance has been employed either in the form of an additional resistor connected in series with the potentiometer and having a resistance approximately one-tenth that of the potentiometer itself or in the form of a potentiometer having an integral stop which prevents rotation of the movable tap beyond the desired minimum resistance value. Either alternative adds unwarranted cost to the television receiver.

The present invention eliminates the necessity for such a limiting resistor.

Accordingly, an object of the invention is to provide an improved contrast control circuit for a television receiver.

Another object of the invention is to provide an improved contrast control circuit for a television receiver whereby the necessity for providing a limiting resistance in series with the contrast potentiometer is eliminated.

These and other objects are achieved in accordance with the invention through the use of a conventional stopless potentiometer for the contrast control, the "cold" end of the potentiometer being connected to the grid of the AGC keyer stage conventionally employed in television receivers rather than directly to the B+ supply. The grid of such an AGC keyer tube is connected to the B+ supply through a relatively low value resistor which thus serves as a limiting resistor in series with the contrast control potentiometer. In this manner the necessity for a discrete limiting resistor or a potentiometer employing a stop is eliminated.

Figure 2:
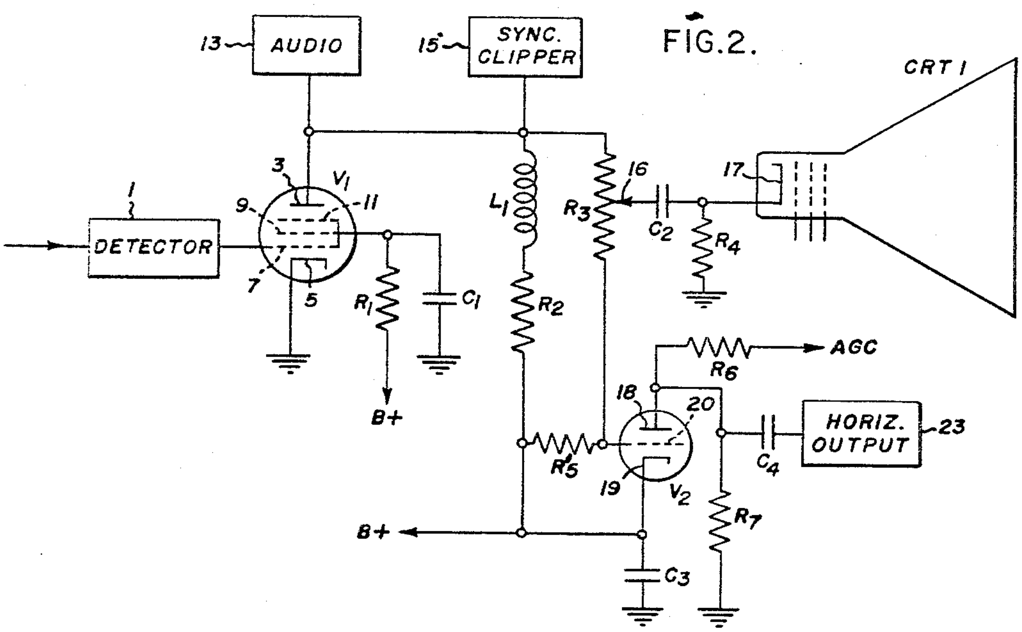

The novel and distinctive features of the invention are set forth in the appended claims. The invention itself together with further objects and advantages thereof may best be understood by reference to the accompanying drawings in which:

FIGURE 1 is a schematic diagram of one embodiment of the contrast control circuit in accordance with the invention, and FIGURE 2 is a schematic diagram of a second embodiment of the contrast control circuit in accordance with the invention.

Referring to FIGURE 1, there is shown in schematic form a preferred embodiment of the invention. As depicted, the IF signal at the output of the final IF amplifier (not shown) is applied to a conventional detector 1. The detected composite signal at the output of the detector 1 is applied to a video amplifier $V_1$ having anode, cathode, control grid, screen grid and suppressor grid electrodes 3, 5, 7, 9, and 11 respectively.

More specifically, the detected composite signal is applied to the control grid 7 of the video amplifier $V_1$ in conventional fashion, the cathode 5 being grounded. The screen grid 9 is connected to a suitable source of B+ voltage through a dropping resistor $R_1$, the resistor $R_1$ being bypassed by a capacitor $C_1$ in conventional fashion. The suppressor grid 11 is internally connected to control grid 7 in conventional fashion.

The amplified composite signal at the anode 3 of video amplifier $V_1$ is applied to the audio circuit 13 which derives the audio signal from the amplified composite signal in conventional fashion. Similarly, the signal at the anode 3 is applied to sync clipper 15, the sync clipper serving to separate the sync information from the video signal in conventional fashion.

A load circuit comprising the serial combination of inductor $L_1$ and load resistor $R_2$ is connected to the anode 3 of video amplifier $V_1$. The inductor $L_1$ serves as a conventional peaking choke to extend the high frequency range of the video amplifier.

A contrast control potentiometer $R_3$ is connected in shunt with the serially connected inductor $L_1$ and load resistor $R_2$, the movable tap 16 of the potentiometer $R_3$ being connected through a capacitor $C_2$ to the cathode 17 of a cathode ray tube $CRT_1$. In this manner the video signal at the movable tap 16 is AC coupled to the cathode 17, the signal being developed across a suitable resistor $R_4$ connected between the cathode 17 and ground. It is thus seen that the positioning of the movable tap 16 determines the peak to peak amplitude of the video signal applied to the cathode 17 of $CRT_1$ and thus provides the desired contrast control.

In accordance with the invention, the end of the contrast control potentiometer $R_3$ most remote from the anode 3 of the video amplifier $V_1$ is connected to the AGC keyer stage $V_2$ rather than being connected directly to the B+ voltage as in the prior art.

As pointed out above, in the prior art contrast control circuit either a potentiometer employing an integral stop or an additional resistance in series with the potentiometer was necessary to prevent the complete loss of video drive to the cathode ray tube when the movable tap of the contrast control potentiometer is positioned at the minimum position. The present invention eliminates the necessity for a potentiometer employing a stop or an additional resistor.

As depicted the AGC keyer $V_2$ comprises a triode having anode, cathode and control grid electrodes 18, 19 and 20, respectively. The contrast control potentiometer $R_3$ is connected directly to the control grid 20 of the triode $V_2$ rather than to the B+ supply itself. Similarly, in the embodiment of FIGURE 1 the load resistor $R_2$ is connected directly to the control grid 20.

A resistor $R_5$ is connected between the control grid 20 and the cathode 19 of triode $V_2$ to develop a portion of the video signal thereacross the cathode 19 being connected to the B+ supply and a decoupling capacitor $C_3$ being connected between the cathode 19 and ground in conventional fashion. The anode 18 of the triode $V_2$ is coupled through a capacitor $C_4$ to the horizontal output stage 23, the flyback pulses at the horizontal output stage thus being employed to key the triode $V_2$ and the conduction of the triode $V_2$ being controlled by the amplitude of the sync pulse portion of the video signal at the grid 20 in conventional fashion. An AGC voltage is thus derived from the anode 18 of the triode $V_2$ and applied to the RF and IF stages (not shown) via a resistor $R_6$, the AGC voltage being developed across a load resistor $R_7$ connected between anode 18 and ground.

The operation of the circuit of FIGURE 1 is such that the amplified composite signal at the anode 3 of the video amplifier $V_1$ is developed across the load comprising serially connected inductor $L_1$ and load resistor $R_2$ in parallel with contrast control potentiometer $R_3$. A portion of the video signal is also developed across the resistor $R_5$ in such a manner that the amplitude of the sync component of the signal developed thereacross controls the conduction of the triode $V_2$ during each keying pulse to develop an AGC voltage at the anode 18 which is a function of signal strength.

The amplified signal appearing across the serially connected inductor $L_1$ and load resistor $R_2$ also appears across the contrast control potentiometer $R_3$. The movable tap 16 of the contrast control potentiometer $R_3$ can be selectively positioned to apply a signal to the cathode 17 of $CRT_1$ having the peak to peak amplitude necessary to provide the desired contrast condition.

Thus, it is seen that when the movable tap 16 is positioned at the end of the potentiometer connected to the anode 3 of video amplifier $V_1$ a maximum contrast condition exists whereas when the movable tap is positioned at the opposite end of the potentiometer a minimum contrast condition exists. Due to the presence of the resistor $R_5$ in the path between the contrast potentiometer $R_3$ and the B+ supply the minimum drive to the cathode 17 of $CRT_1$ cannot be reduced to a level below that of the signal appearing across the resistor $R_5$. Accordingly, a user cannot completely eliminate video drive by minimum setting of the contrast control. Thus, through the connecting of the contrast potentiometer to the grid 20 of the AGC keyer $V_2$ the necessity for an expensive potentiometer having an integral stop or an additional resistor in series with the potentiometer is eliminated.

In one particularly successful implementation of the circuit of FIGURE 1, the following circuit values and elements were employed:

| | | |
|---|---|---|
| $V_1$ | | ⅓ 14BR11 |
| $V_2$ | | ⅓ 14BR11 |
| $CRT_1$ | | 16CFP4 |
| $R_1$ | ohms | 1500 |
| $R_2$ | do | 4.7 |
| $R_3$ | do | 25K |
| $R_4$ | do | 150K |
| $R_5$ | do | 220 |
| $R_6$ | do | 100K |
| $R_7$ | megohm | 1 |
| $C_1$ | pf | 800 |
| $C_2$ | mf | 0.1 |
| $C_3$ | pf | 800 |
| $C_4$ | pf | 800 |
| $L_1$ | $\mu$h | 750 |
| B+ | volts | 140 |

It will be appreciated that since the value of the potentiometer $R_3$ is large compared to that of the load resistor $R_2$ the wide range of tolerances customarily associated with the potentiometer $R_3$ will have little effect on the signal appearing on the grid of the triode $V_2$ which defines the AGC voltage.

Referring now to FIGURE 2, there is shown a second embodiment of the invention, the embodiment of FIGURE 2 being basically identical to that of FIGURE 1 and common reference numerals being employed to identify similar elements in each figure.

The embodiment of FIGURE 2 differs from that of FIGURE 1 in that the serially connected inductor $L_1$ and load resistor $R_2$ are connected directly to the B+ voltage rather than through a resistor $R_5$ as in FIGURE 1. The contrast potentiometer $R_3$ is again connected directly to the grid 21 of triode $V_2$ as in the embodiment of FIGURE 1, the grid 21 being connected to the cathode 19 via a resistor $R_5'$.

Thus, it will be seen in the embodiment of FIGURE 2 that the resistor $R_5'$ although in series with the contrast potentiometer $R_3$ is not in the path between the series connection of peaking choke $L_1$ and load resistor $R_2$ and the B+ supply as is the case in the embodiment of FIGURE 1. However, resistor $R_5'$ serves a similar function in the embodiment of FIGURE 2 as does $R_5$ in the embodiment of FIGURE 1, namely that of providing some drive to the cathode 17 of $CRT_1$ at a minimum setting of the contrast potentiometer $R_3$ and simultaneously supplying signal to the grid of the triode $V_2$. In the embodiment of FIGURE 2 the circuit elements and values are identical to those of the embodiment of FIGURE 1 except for the resistors $R_2$ and $R_5'$ and the contrast potentiometer $R_3$ which may have values as follows:

| | | |
|---|---|---|
| $R_2$ | ohms | 5.1K |
| $R_5'$ | do | 2.7K |
| $R_3$ | do | 2.7K |

It is seen that in the embodiment of FIGURE 2 the voltage at the grid 20 of the triode $V_2$ is effected to a greater degree by variations in the value of the contrast potentiometer $R_3$ within the tolerances thereof than is the case in the embodiment of FIGURE 1.

Although the invention has been described with respect to certain embodiments, it will be appreciated that modifications and changes may be made by those skilled in the art without departing from the true spirit and scope of the invention. Thus, it is intended by the appended claims to cover all such modifications and changes as fall within the true spirit and scope of the invention.

What I claim and desire to secure by Letters Patent of the United States is:

1. In a television receiver including a video amplifier having an output electrode, an AGC keyer having a control electrode, and a cathode ray tube, a circuit comprising;

(a) a resistive means connecting the control electrode of the AGC keyer to a source of DC operating potential,
(b) load means connected between the output electrode of the video amplifier and the source of DC operating potential,
(c) said load means including a contrast control potentiometer having a movable tap, and
(d) said contrast control potentiometer having one end coupled to the output electrode of the video amplifier, the other end thereof being directly connected to the control electrode of the AGC keyer and said movable tap being coupled to the cathode ray tube to apply a video signal thereto.

2. In a television receiver including a video amplifier having an output electrode, an AGC keyer tube having anode, cathode, and control grid electrodes, and a cathode ray tube, a circuit comprising;
(a) resistive means connected between the control grid electrode and cathode electrode of the AGC keyer tube.
(b) the cathode electrode of the AGC keyer tube being connected to a source of positive DC potential,
(c) load means including a serially connected peaking inductor and load resistor connected between the output electrode of the video amplifier and the source of DC potential,
(d) a contrast control potentiometer directly connected between the output electrode of the video amplifier and the control grid of the AGC keyer tube, and
(e) said contrast control potentiometer having a movable tap coupled to the cathode ray tube to apply a video signal thereto.

3. The circuit defined in claim 2 wherein said load means is connected directly to the control grid of the AGC keyer.

4. The circuit defined in claim 2 wherein said load means is connected directly to the cathode of the AGC keyer.

5. The circuit defined in claim 2 wherein the cathode ray tube includes a cathode and said movable tap is coupled to the cathode of the cathode ray tube by a capacitor.

References Cited

UNITED STATES PATENTS 2,988,594 6/1961 Stroh _______________ 178—7.3

ROBERT L. GRIFFIN, *Primary Examiner.*
ROBERT L. RICHARDSON, *Assistant Examiner.*